(12) United States Patent
Verduijn et al.

(10) Patent No.: US 11,281,353 B2
(45) Date of Patent: Mar. 22, 2022

(54) METHOD FOR MOVING AN OBJECT IN A VIRTUAL ENVIRONMENT AND DEVICE CONFIGURED TO IMPLEMENT SUCH A METHOD

(71) Applicant: ATOS NEDERLAND BV, Amstelveen (NL)

(72) Inventors: Pieter Verduijn, Amsterdam (NL); Lars Temmink, Maarssen (NL); Danny Oldenhave, Westervoort (NL); Wim Ederveen, Harderwijk (NL); Erik Kuiper, Groningen (NL)

(73) Assignee: ATOS FRANCE, Bezons (FR)

( * ) Notice: Subject to any disclaimer, the term of this patent is extended or adjusted under 35 U.S.C. 154(b) by 0 days.

(21) Appl. No.: 17/351,139

(22) Filed: Jun. 17, 2021

(65) Prior Publication Data
US 2021/0397329 A1    Dec. 23, 2021

(30) Foreign Application Priority Data

Jun. 19, 2020 (EP) .................................... 20305676

(51) Int. Cl.
*G06F 3/0484* (2013.01)
*G06F 3/04815* (2022.01)
(Continued)

(52) U.S. Cl.
CPC ...... *G06F 3/04815* (2013.01); *G06F 3/04845* (2013.01); *G06F 3/04895* (2013.01)

(58) Field of Classification Search
CPC ...... G06F 3/011; G06F 3/017; G06F 3/04815; G06F 3/0346; G06F 3/167; G06F 3/013; G06F 3/04883; G06F 3/012; G06F 3/0482; G06F 3/0304; G06F 3/0488; G06F 3/04845; G06F 3/016; G06F 3/04817;
(Continued)

(56) References Cited

U.S. PATENT DOCUMENTS

2009/0079732 A1* 3/2009 Fitzmaurice ........ G06F 3/04815
                                                   345/419
2014/0006966 A1* 1/2014 Geraci ................. G06T 19/006
                                                   715/748

FOREIGN PATENT DOCUMENTS

WO    2009042909 A1    4/2009

OTHER PUBLICATIONS

European Search Report dated in EP20305676.7, dated Dec. 8, 2020; 8 pages.

* cited by examiner

*Primary Examiner* — Rayeez R Chowdhury
(74) *Attorney, Agent, or Firm* — Arc IP Law, PC; Joseph J. Mayo

(57) ABSTRACT

A method for moving and orienting an object in a virtual reality or augmented reality environment that uses a movement tool with multiple states that correspond to the actions that a user may take to manipulate the object. The movement tool may have a stored position and orientation that are applied directly to the object without the need for user input; if these parameters are not stored, the movement tool may enter a moving or placing state, and/or an orientation state where the user can set the position or orientation, respectively. Additional movement tool states may include a rotation state and a translation state. State-specific guides or controls may be shown in certain states of the movement tool. These tools may enable a user to perform accurate and (Continued)

intuitive actions to move, scale or rotate an object in an n-dimensional space with millimeter precision.

7 Claims, 12 Drawing Sheets

(51) Int. Cl.
*G06F 3/04895* (2022.01)
*G06F 3/04845* (2022.01)

(58) Field of Classification Search
CPC ........ G06F 3/0485; G06F 17/00; G06F 1/163; G06F 16/29; G06F 17/11; G06F 17/16; G06F 2203/011; G06F 30/00; G06F 3/015; G06F 3/0481; G06F 3/0483; G06F 3/0484; G06F 3/0362; G06F 1/169; G06F 1/1616; G06F 3/04895; G06F 3/0213; G06F 1/162; G06F 1/1626; G06F 1/1692; G06F 2203/0333; G06F 2203/0335; G06F 3/03543; G06F 3/03545; G06F 3/038; G06F 3/04886

See application file for complete search history.

VE  IL  MT

METHOD FOR MOVING AN OBJECT IN A VIRTUAL ENVIRONMENT AND DEVICE CONFIGURED TO IMPLEMENT SUCH A METHOD

This application claims foreign priority to European Patent Application No. 20305676.7 filed on Jun. 19, 2020, the specification of which is hereby incorporated herein by reference.

BACKGROUND OF THE INVENTION

Field of the Invention

The field of the invention is computer generated virtual reality, and more precisely relates to how a user interacts with virtual objects. One or more embodiments of the invention enable a method for moving object in a virtual environment hosted on a computer and a device configured to implement such a method.

Description of the Related Art

In virtual reality or augmented reality, it is important to accurately interact with object inside the virtual environment. Unfortunately, the current solutions are not accurate enough in several cases to position, move, scale or rotate a holographic object in an n-dimensional space with millimeter precision. Furthermore, they do not provide direct feedback to end users, because position, move, scale and rotate solutions are not aligned (and therefore not always in direct view of each other) with the corresponding object and are not intuitive in regard to directional input, e.g. when an object is rotated 180 degrees the front becomes the back and input seems reversed. Moreover, current solutions mainly focus on 2D interaction elements, losing its intuitiveness when working with dimensional spaces other than 2 dimensions.

Current solutions generally provide directional arrows in a panel which do not allow for intuitive directional input and does not provide direct feedback. They also provide a drag/drop functionality to drag/drop object to move by some input (e.g. mouse, hand movement, voice) but it allows only for limited movement on axis, only in relation to user and do not allow millimeter accuracy. Furthermore, they provide only one aspect of translation (position, move, scale and rotate) in relation to selected object and therefore there is no possibility to translate the corresponding object in multiple ways with millimeter accuracy. An example of such interface is Gizmo. But Gizmo works in a 2D environment only and therefore not available in n-dimensional space with n>2. Moreover, it allows only for one aspect of translation and does not allows for incremental steps in transformation. Furthermore, it only works with click and drag function.

Therefore, there is a need for a method to accurately interact with object in virtual environment.

BRIEF SUMMARY OF THE INVENTION

One or more embodiments of the invention provide a solution to the above-described needs by proposing a method in which the user interact with a movement tool that adopt different states and provide functionalities according to those states.

A first aspect of one or more embodiments of the invention concerns a method for moving a target object in a virtual environment visualized using a camera. The method according to the first aspect of one or more embodiments of the invention comprises the step of:

generating of a movement tool, said movement tool being at any moment in one and only one of the following states: the initial state, the anchor state, the moving state, the orientation state, the rotation state and the translation state; each state being associated with a specific configuration of the movement tool and/or specific action performed by the movement tool;

setting the movement tool in the initial state in which the target object is not yet selected;

upon selection of the target object, setting the movement tool in the anchor state in which the existence of a stored position and/or orientation of the movement tool in the virtual environment is performed;

if no position is stored, setting the movement tool in the placing state in which only the movement tool is visible and configured to follow the looking direction of the camera and in which the user sets the position in which the target object is placed;

if no orientation is stored, setting the movement tool in the orientation state in which the movement tool is visible along with a right direction button and/or a left direction button and in which the user sets the direction in which the target object is placed using said direction buttons;

setting the movement tool in the rotation state in which the movement tool and the target object are visible and in which the rotation of the target object is set using buttons associated with the movement tool;

setting the movement tool in the translation state the movement tool and the target object are visible and in which the position of the target object is set using buttons associated with the movement tool.

Thanks to one or more embodiments of the invention, each state allows a specific set of movement. This division into different states of the movement tools improves the accuracy with which the movement is performed.

The method according to the first aspect of one or more embodiments of the invention can also comprise one or more of the following technical characteristics.

In an embodiment, selecting the forward direction of the movement tool is done by the user by walking around the movement tool.

In an embodiment, the generation of the movement tool comprises:

the generation of a plurality of buttons, each button being associated with one or more states of a plurality of mutually exclusive states of the movement tool;

when the movement tool is in the orientation state, the generation of a plurality of direction indicator lines only one being displayed at a time, and a left and a right arrow buttons, each indicator line being associated with a position of the target object with respect to the movement tool, the direction of the direction indicator line to be displayed being set using left and a right arrow buttons;

when the movement tool is in the rotation state, the generation of a backward, forward, up, down, right and left rotation, each rotation button being associated with a rotation movement of the target object, the target object being rotated according to said rotation upon selection of the corresponding button;

when the movement tool is in the translation state, the orientation state, the generation of a backward, forward, left, right, down and up translation buttons, each translation button being associated with a translation movement of the target object, the target object being translated according to said translation upon selection of the corresponding button.

A second aspect of one or more embodiments of the invention concerns a device comprising means configured to perform the steps of the method according to a first aspect of one or more embodiments of the invention.

A third aspect of one or more embodiments of the invention concerns a computer program comprising instructions which, when the program is executed by a computer, cause the computer to carry out the method according to the first aspect of the one or more embodiments of the invention.

A fourth aspect of one or more embodiments of the invention concerns a computer-readable data carrier having stored thereon the computer program according to a third aspect of one or more embodiments of one or more embodiments of the invention.

DETAILED DESCRIPTION OF THE INVENTION

Figure 1:
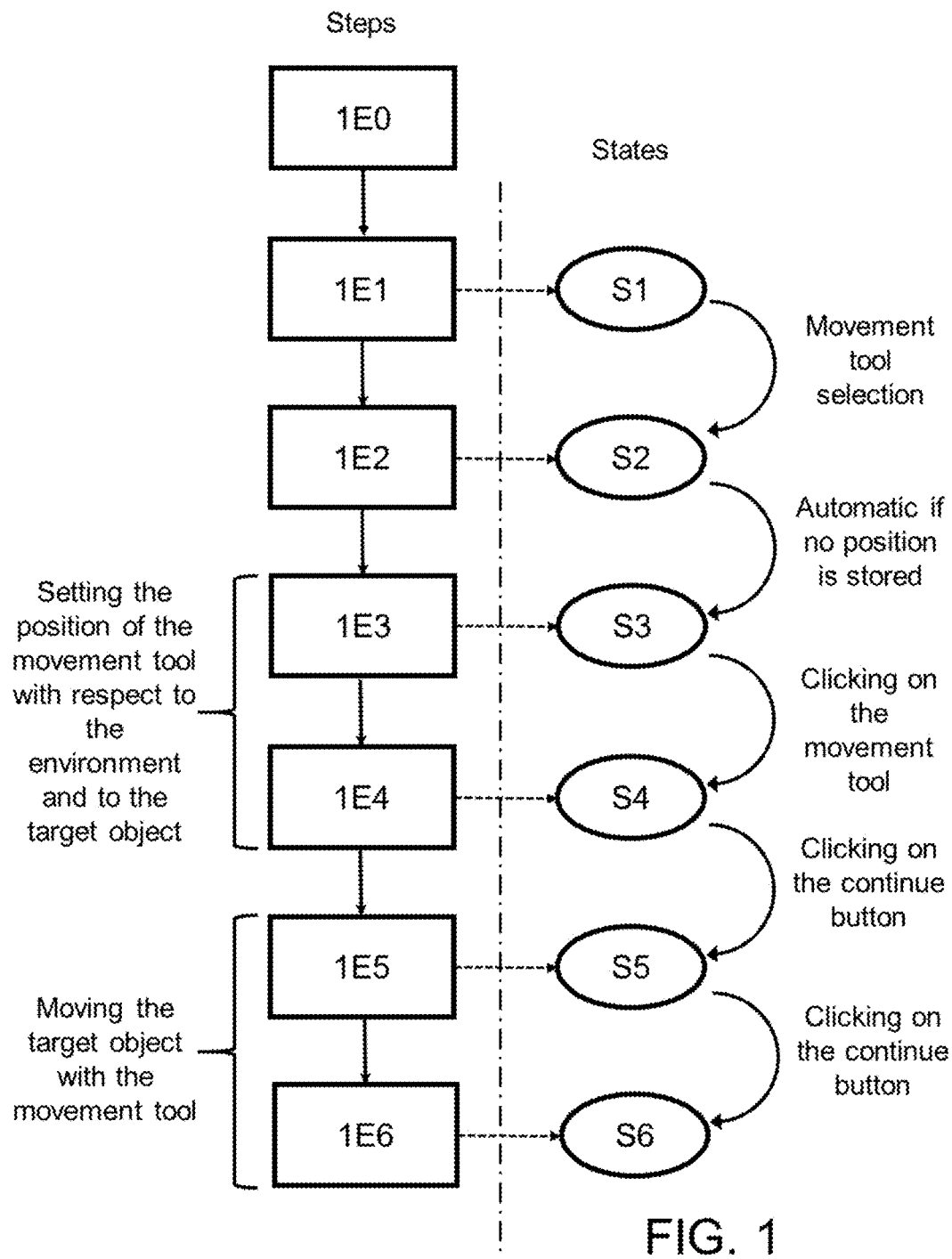
FIG. 1 shows a logogram of the method according to an illustrative embodiment of the invention.

A first aspect of one or more embodiments of the invention illustrated in FIG. 1 concerns a method 100 for moving a target object TO in a virtual environment VE visualized using a camera, for instance a HoloLens®. The target object TO is a virtual object in a virtual environment VE. The virtual environment VE can take place in a virtual reality or in an augmented reality.

In order to move the target object TO, the method 100 according to one or more embodiments of the invention comprises the generation 1E0 of a movement tool MT. This movement tool MT is configured to be in one and only one of the following states at a time: the initial (or default) state S1, the anchor state S2, the moving state S3, the orientation state S4, the rotation state S5 and the translation state S6. In the following, the states in general will be referenced using the reference Sx. Those states will be described later. Each states Sx is associated with a specific configuration of the movement tool MT and/or specific action performed by the movement tool MT.

In an embodiment, the movement tool MT is configured to display, depending on its state, a plurality of action buttons comprising:
  a backward-state B button that, when clicked, switches the movement tool MT to the previous state Sx (if any), this button being only visible when the movement tool MT is in the moving state S3, the orientation state S4, the rotation state S5 or the translation state S6;
  a forward-state F button that, when clicked, switches the movement tool MT to the next state Sx (if any), this button being only visible when the movement tool MT is in the moving state S3, the orientation state S4, the rotation state S5 or the translation state S6;
  a right S4A1 and left S4A2 direction buttons that, when clicked, change the orientation of the movement tool MT according to the direction associated to them (i.e. right or left), these buttons being only visible in the orientation state S4 of the movement tool MT;
  backward S5A1, forward S5A2, up S5A3, down S5A4, right S5A5 and left S5A6 rotation buttons that, when clicked, rotate the target object TO in the corresponding rotation, these rotation buttons being only visible in the rotation state S5 of the movement tool MT;
  at least a backward S5A1, forward S5A2, up S5A3, down S5A4, right S5A5 and left S5A6 rotation button that, when clicked, translate the target object TO in the corresponding direction, these buttons being only visible when movement tool MT is in the translation state S6.

The Initial State

The method 100 according to one or more embodiments of the invention further comprises a step 1E1 of setting the movement tool MT is the initial state S1 (or default state) in which the target object TO is not yet selected. As already mentioned, in this state S1, the movement tool MT is not visible.

The Anchor State

Upon selection of the target object TO by the user, the method 100 comprises a second step 1E2 of setting the movement tool MT in the anchor state S2 in which the existence of a stored position and/or orientation of the movement tool MT is performed. As already mentioned, in this state S2, the movement tool MT is not visible. As it will be described in the following paragraphs, when such stored position and/or orientation exists, the movement tool MT skips the placing state S3 and orientation state S4 and is directly set in the rotation state S5. This behavior avoids the user to go through the placing state S3 and the orientation state S4 of the movement tool MT when the information concerning those parameters is already stored. But thanks to the presence of a backward-state B button, when the user is not happy with the stored position or orientation, he can always go back to the placing state S3 or the orientation state S4. Therefore, this state S2 gets performed by the movement tool MT, but will usually not be noticed by the user.

The Placing State

Figure 2:
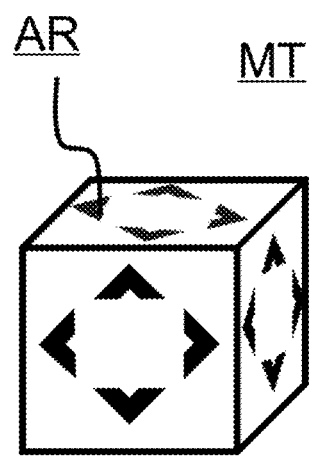
FIG. 2 shows the movement tool in the placing state.
Figure 3:
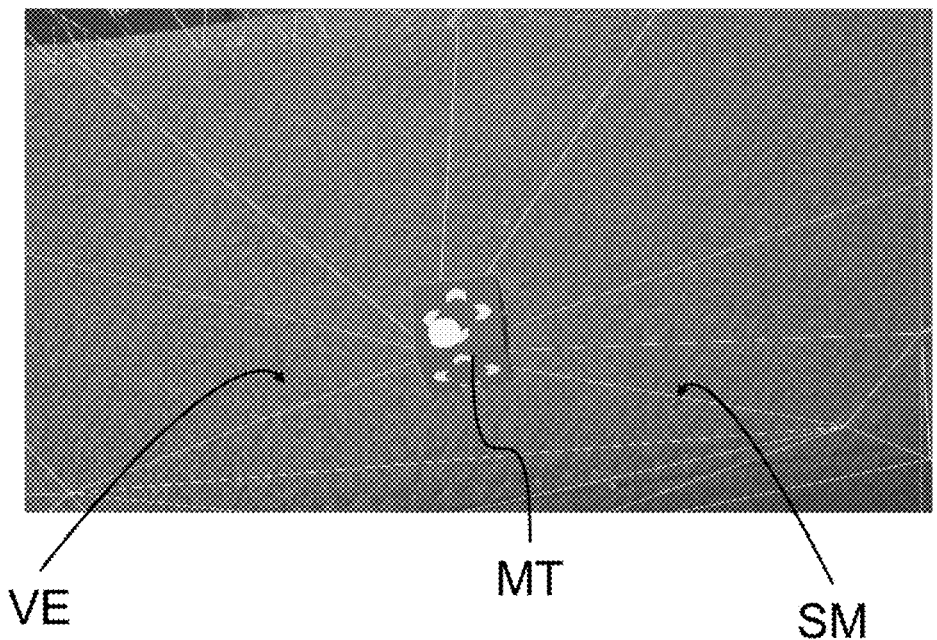
FIG. 3 shows the movement tool in the placing state inside the virtual environment.
Figure 4:
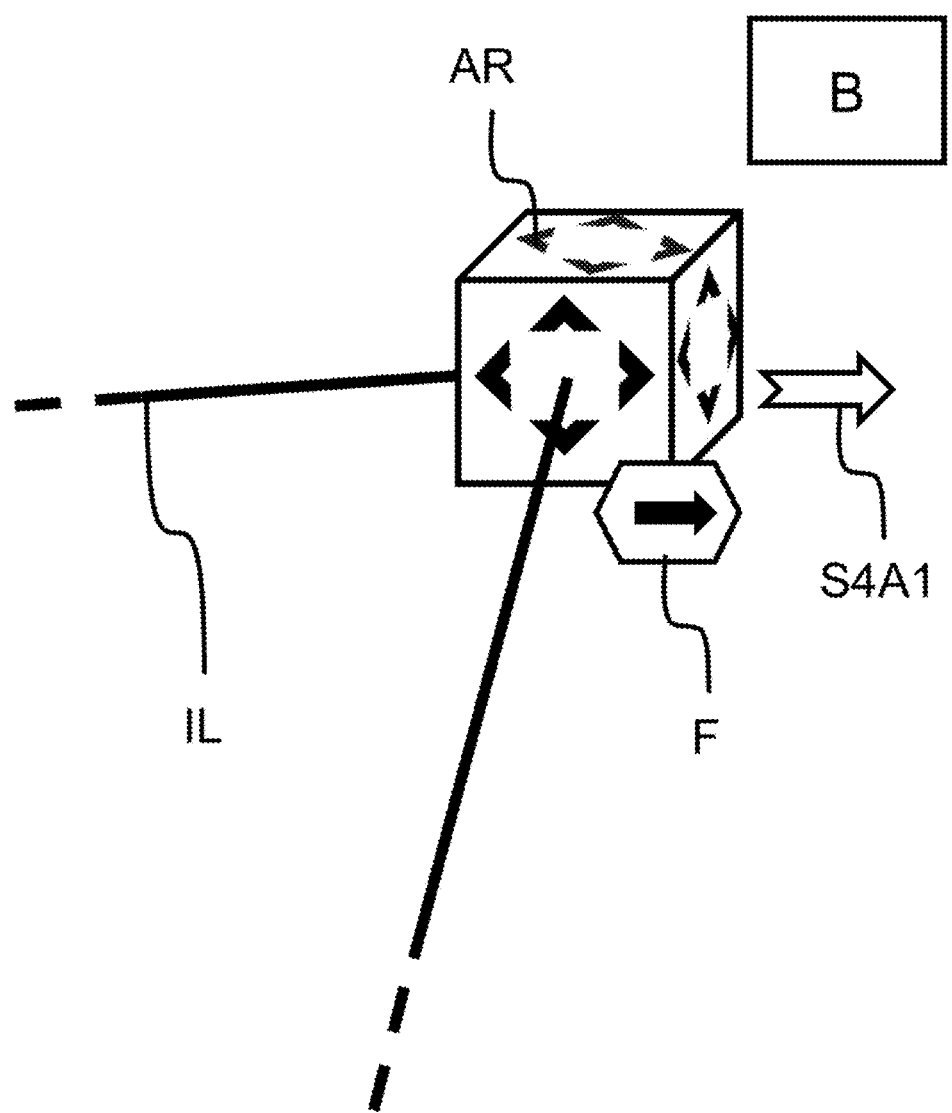
FIGS. 4 and 5 shows the movement tool in the orientation state with a left oriented (FIG. 4) and a right oriented (FIG. 5) direction indicator line.
Figure 5:
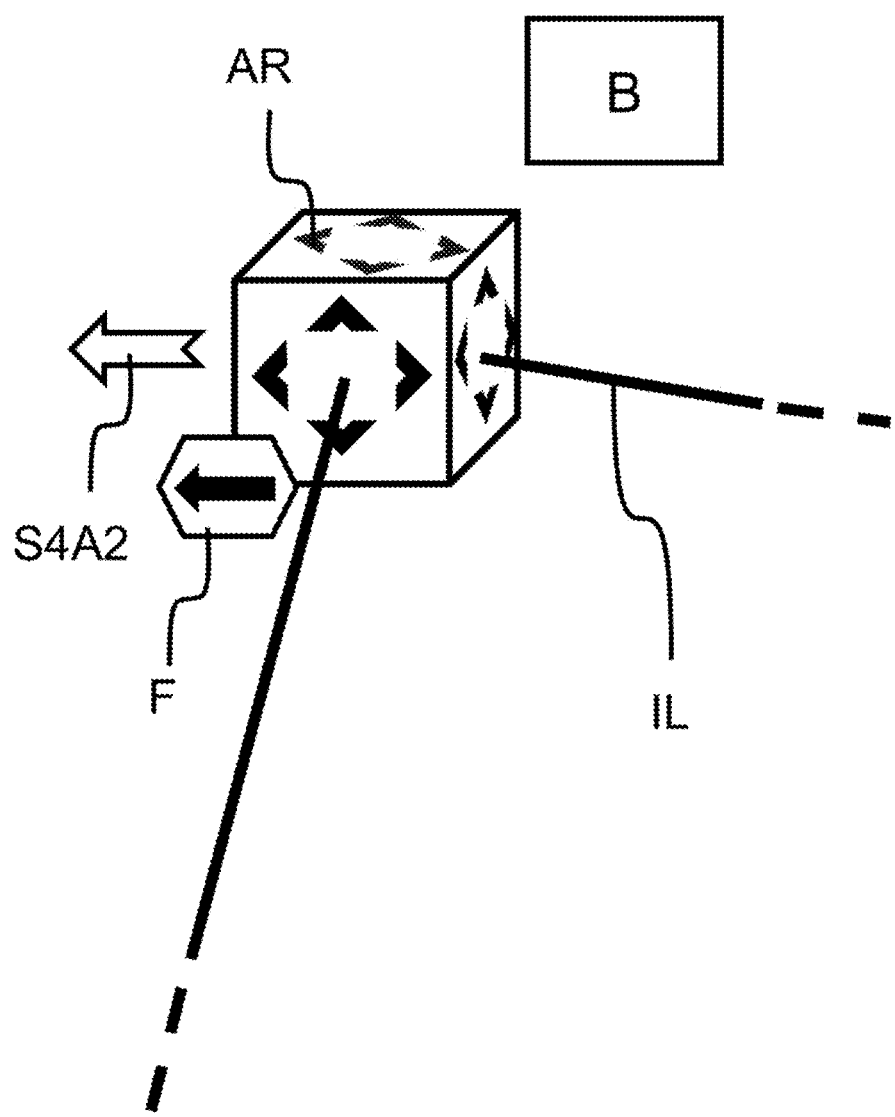

If no position is stored, the method 100 comprises a third step 1E3 of setting the movement tool MT in the placing state S3. In this state S3, the movement tool MT is visible, follows the looking direction of the camera CA (e.g. HoloLens®) and, may for example stay in the middle of the screen. The movement tool MT in the placing state S3 is illustrated in FIG. 2 and FIG. 3. In this state, the movement tool MT only display visual indications AR of the center of the movement tool translation buttons AR. These visual indications are optional and, in this state, the movement tool MT is only represented by a geometrical shape, like a cube in the examples of the figures. In an embodiment, when in this state S3, the movement tool MT stays a predetermined distance away from the camera CA. In an embodiment, the predetermined distance can be set by the user. In an embodiment, this predetermined distance can be chosen anywhere from 0.75 meters to 2 meters. In an embodiment, when in the placing state S3, the movement tool MT is scaled smaller compared to its size in the other states to allow the user to accurately place the movement tool MT, for instance scaled at 1/10th of its normal scale. In an embodiment, clicking on the movement tool MT, for instance clicking on the visual indications AR, finalize its position and set it into its orientation state S4. Therefore, a forward-state button F is not needed in this state S3.

In an embodiment illustrated in FIG. 3, for instance when using a HoloLens® as a camera (but it applies to any devices that can be used as a camera and are able to generate a spatial map SM), a spatial map SM is also visible when the movement tool MT is in the placing state S3 (the spatial map SM appears as white line over the virtual environment VE in the FIG. 3). As a reminder, a spatial map SM is an interpretation of the spatial sensors of a given device (here an Hololens®). This spatial map SM can be different for each device but always corresponds to the mapping of the environment around the user (e.g. time of flight, depth map, textures). The "Spatial mapping" (also called 3D reconstruction) is the ability to create a 3D map of the environment and allows a device to understand and interact with the real world. Among other things, spatial mapping is useful for collision avoidance, motion planning, and realistic blending of the real and virtual world. Displaying the spatial mapping allows the user to place the movement tool directly on top of the spatial map SM.

In an embodiment, when the user gets closer to the spatial map SM than the predetermined distance, the predetermined distance is reduced to accommodate the new position of the user. In an embodiment, to calculate the new value of the predetermined distance, a ray cast is shot from the camera (e.g. HoloLens®) in the forward direction until it hits the spatial map SM. Thanks to this reevaluation of the predetermined distance, the movement tool MT gets closer to the camera CA when the user gets closer to the part of the spatial map SM he is looking at.

The Orientation State

If no orientation is stored, the method 100 comprises a fourth step 1E4 of setting the movement tool MT in the orientation state S4. The movement tool MT in the orientation state is illustrated in FIGS. 4 to 8. In the orientation state S4, the movement tool MT is visible and displays direction indicator lines IL, a backward-state button B, a forward-state button F and an left S4A2 or right S4A1 arrow button, the right arrow button S4A1 being displayed when the direction indicator line IL is left oriented (i.e. pointing to the left—see FIG. 4) and the left arrow button S4A2 being displayed when the direction indicator line IL is right oriented (i.e. pointing to the right—see FIG. 5). The right arrow button S4A1, when clicked, switches the direction indicator line IL orientation from left oriented to right oriented. The left arrow button S4A2, when clicked, switches the direction indicator line IL orientation from right oriented to left oriented.

In this state S4, the user determines the direction in which the target object TO will be placed knowing that the movement tool MT represents the corner from which the target object TO will be placed, not the center of the target object TO. The forward-state button F is placed independently from the other buttons and therefore can be moved along the forward direction indicator line IL (pointing toward the camera) depending on which part of the line the user is looking at. This allows the user to look at its feet to properly align the end of the indicator line IL and directly press the forward-state button F to go to the rotation state S5 of the movement tool MT. If the forward-state button F were to stay with the backward-state button B, for instance to the top right of the movement tool MT, the user would have to align the end of the indicator line IL and then look up at the forward-state button F to switch to the next state. This could cause a slight change in the forward placement direction and offset the user alignment. The backward-state button, when clicked, set the movement tool MT back in the placing state S3.

Figure 8:
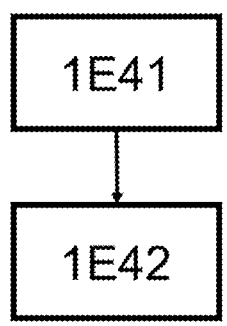
FIG. 8 shows a logogram of one of the steps of the method according to one or more embodiments of the invention.
Figure 9:
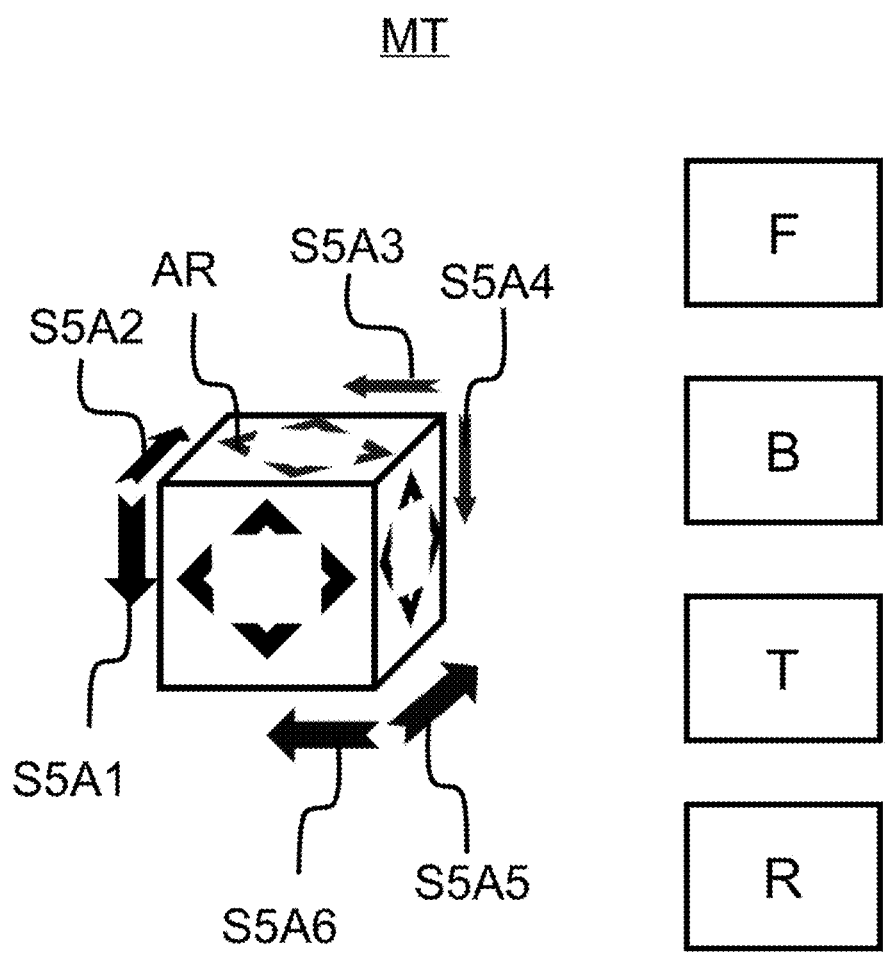
FIG. 9 shows the movement tool in the rotation state.
Figure 10:
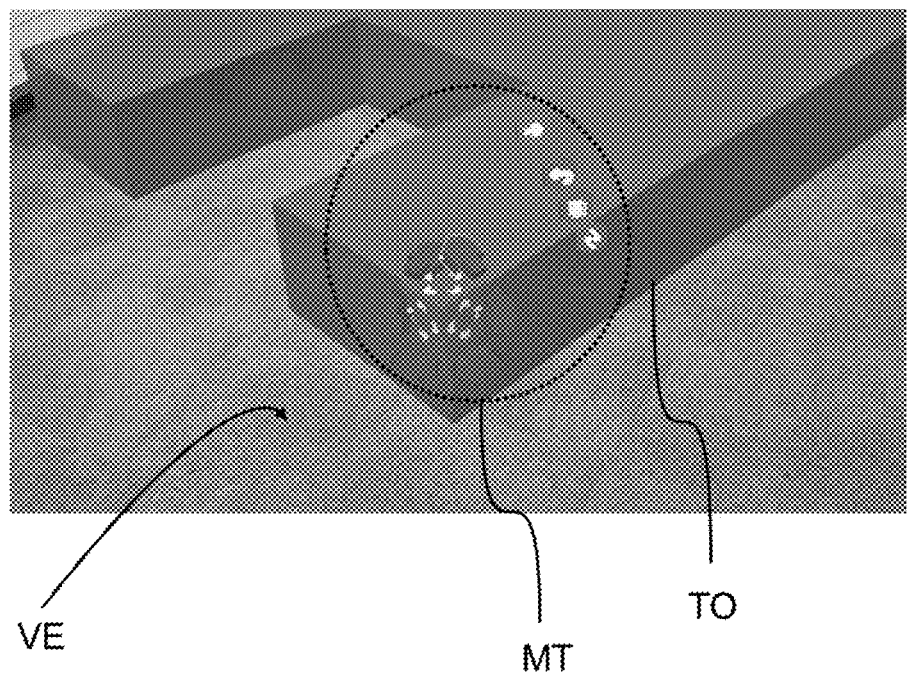
FIG. 10 shows the movement tool in the rotation state as well as the target object inside the virtual environment.

In an embodiment illustrated in FIG. 8, the determination 1E4 of the direction in which the target object TO will be placed comprises two steps 1E41, 1E42. It comprises a first step 1E41 of selection, by the user, of the position of the movement tool MT with respect to the target object TO, the selection being made between a left position (corresponding to the left oriented indicator line IL of FIG. 4) where the target object TO is placed at the left of the movement tool MT and a right position (corresponding to the right oriented indicator line of FIG. 5) where the target object TO is placed at the right of the movement tool MT. In an embodiment, the direction indicator line shows the currently selected direction, as shown in the FIG. 4 where the left side of the movement tool MT has been selected. By clicking on the right S4A1 (left S4A2) arrow buttons of the movement tool MT, the right (left) direction indicator line IL becomes active.

Figure 6:
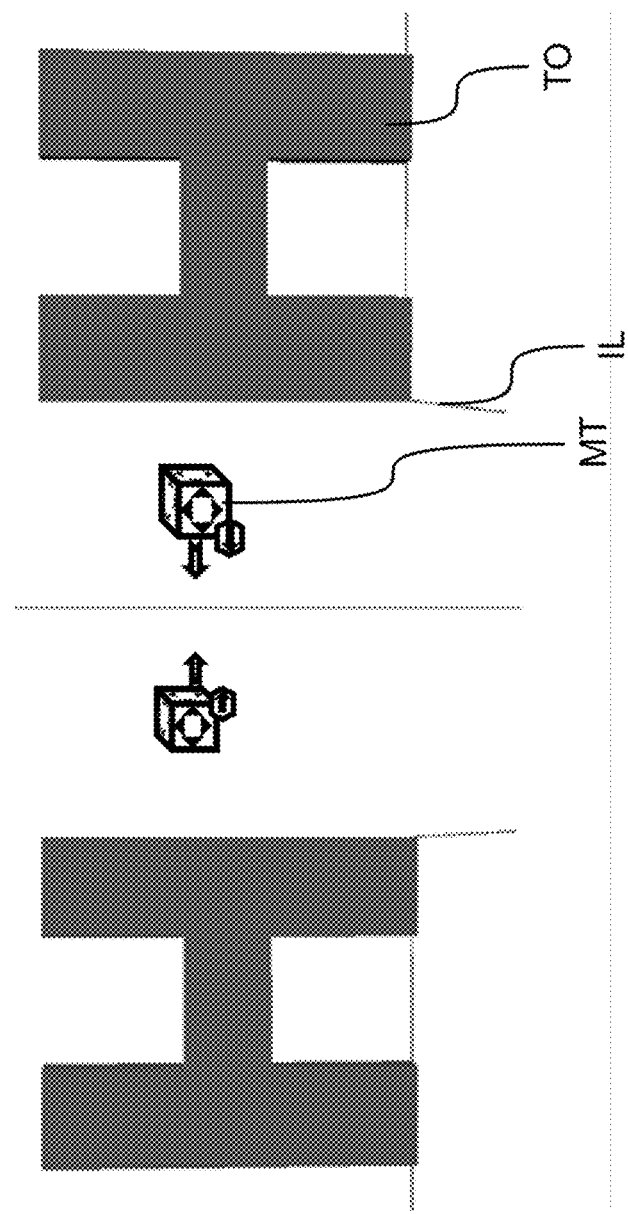
FIG. 6 shows a target object in the two different directions.
Figure 7:
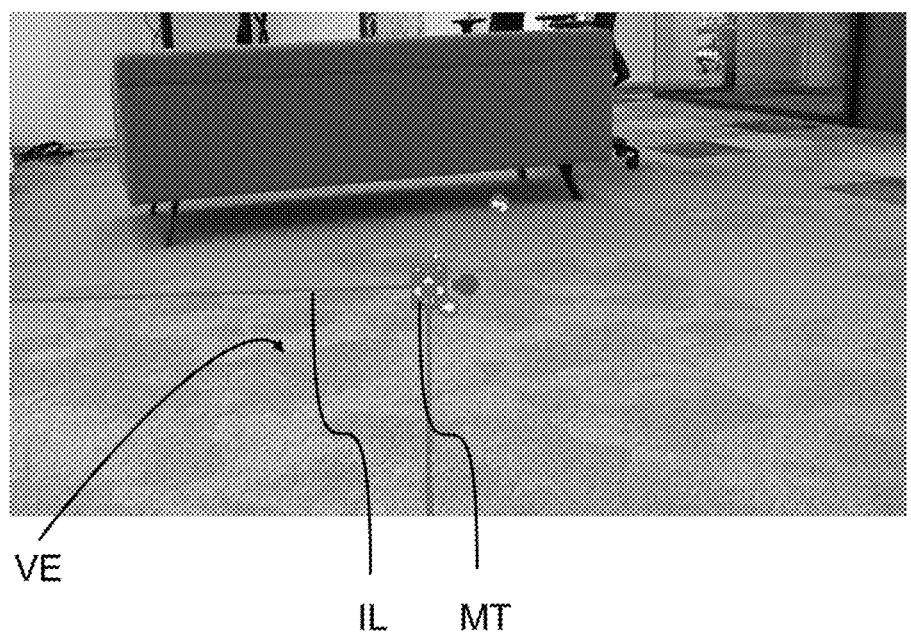
FIG. 7 shows the movement tool in the orientation state inside the virtual environment.

The determination 1E4 of the direction in which the target object will be placed further comprises a second step 1E42 of selection, by the user, of the forward direction of the movement tool MT. In an embodiment, this selection is done by the user by walking around the movement tool MT. The entire movement tool MT will then rotate in the y-axis (i.e. the vertical axis as it is the convention in the field) so the forward direction line will stay pointed in the direction of the camera CA. This two steps process is very useful when the user wants to align the target object TO with the edge of another object, a table for example. In this case, the user would place the movement tool MT on one corner of the table and then stand next to another corner of the table to align the direction indicator line with the edge of the table. The FIG. 6 shows on the left side the target object TO in the left direction an on the right side the target object TO in the right direction while the FIG. 7 shows the movement tool in the orientation state inside the virtual environment. It can be useful to note that the order in which those two steps are performed is not important as long as they are completed.

The Rotation State

Figure 11:
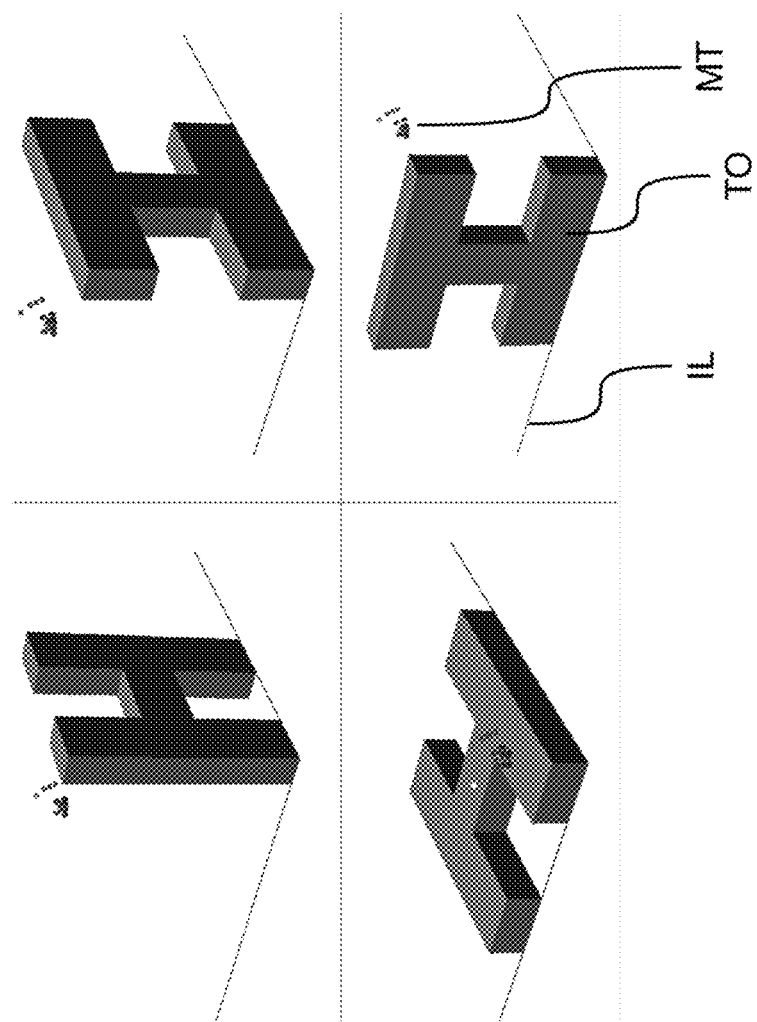
FIGS. 11 and 12 illustrate the actions that can be performed on the target object when the movement tool is in the rotation state.
Figure 12:
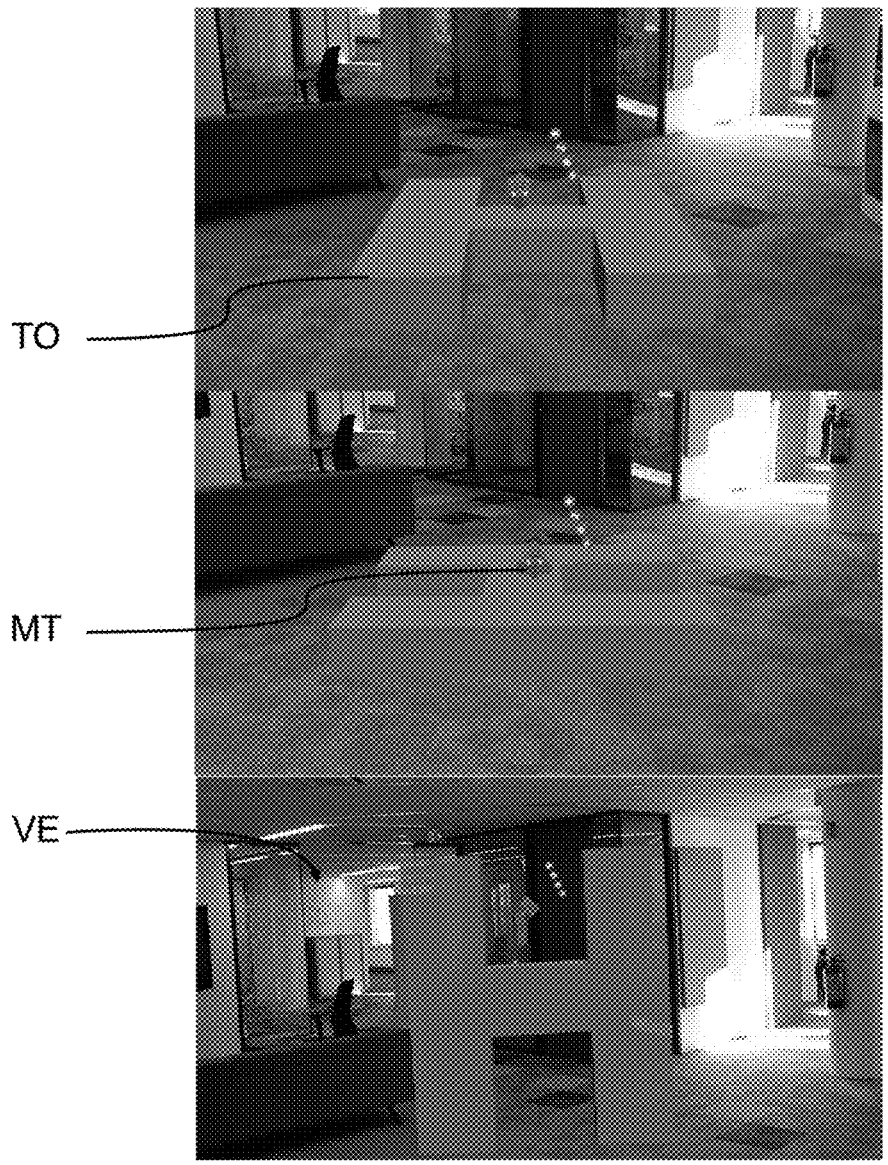

Upon selection of the user, for instance by clicking on the forward-state button F while in the previous state S4, the method 100 according to one or more embodiments of the invention comprises a step 1E5 of setting the movement tool MT in the rotation state S5. As illustrated in FIGS. 9, 10, 11 and 12, in this state S5, the movement tool MT displays a backward S5A1, forward S5A2, up S5A3, down S5A4, right S5A5 and left S5A6 rotation buttons, a backward-state button B and a forward-state button F. In an embodiment, when in the rotation state, the movement tool MT also display a reset button R and/or a transparency button T. Clicking any of the rotation arrows will result in the target object TO rotating 90 degrees in the direction of the arrow as shown in FIG. 11 or 12. The target object TO will also stay in the placement direction selected in the orientation state S4 such that, as illustrated in FIG. 11, the target object TO never crosses any of the indicator lines IL no matter how it rotates. Furthermore, when rotating the target object TO, the movement tool MT rotates with it to stay in sync. This makes sure that, for instance, clicking the arrow that is currently pointing left will also rotate the target object TO left. Clicking the reset button R will undo all rotations that have been performed on the target object TO while clicking on the transparency button T allows to change the transparency of the target object TO.

In an embodiment, the rotation buttons are divided up in three groups: a first group comprising the up S5A3 and the down S5A4 rotation buttons, a second group comprising the left S5A6 and the right S5A5 rotation buttons and a third group comprising the forward S5A2 and the backward S5A1 rotation buttons. In this embodiment, the rotation buttons are displayed according to this grouping. In an embodiment, each group rotates around the movement tool MT to make sure that the user can always see and click on the rotation buttons. In other words, each group rotate according to the movement of the camera.

The Translating State

Figure 13:
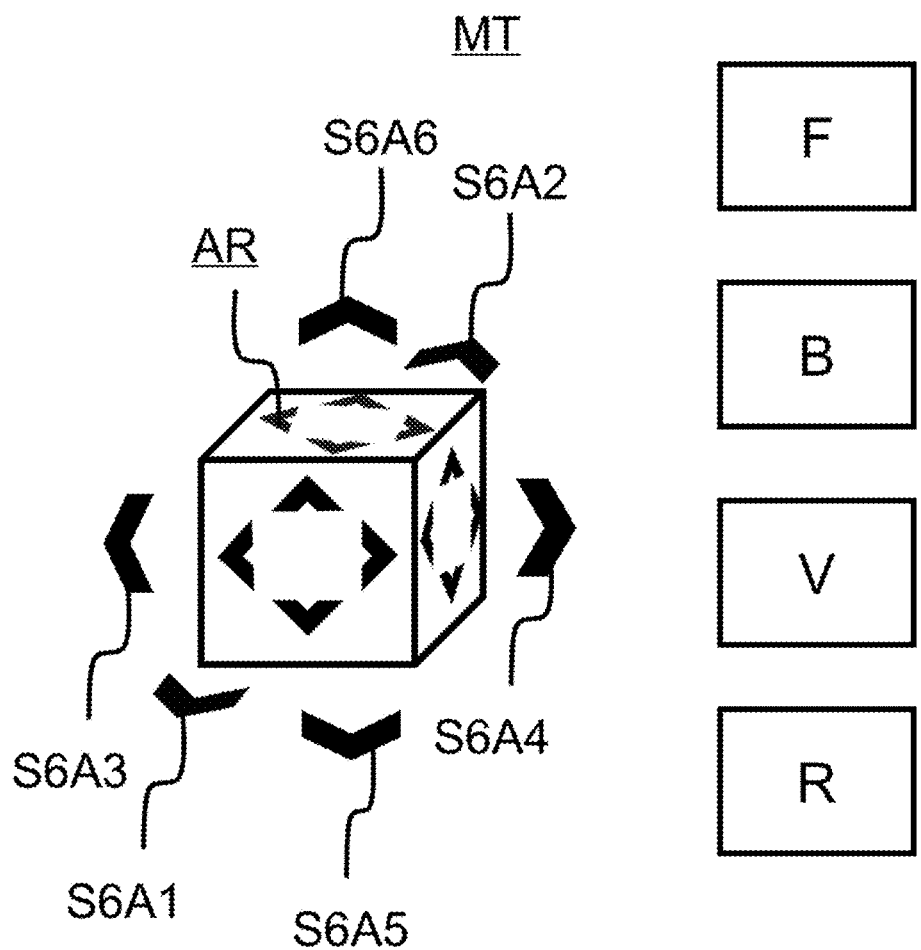
FIG. 13 shows the movement tool in the translation state.
Figure 14:
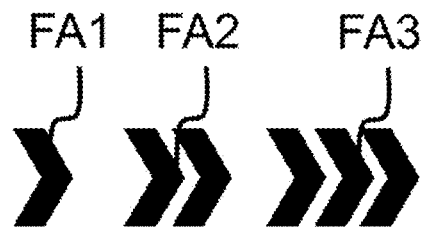
FIG. 14 shows three translation buttons each associated with a different translation amplitude.

Upon selection of the user, the method 100 according to one or more embodiments of the invention comprises a sixth step 1E6 of setting the movement tool MT in the translation state S6. As illustrated in FIG. 13, in this state the movement tool MT displays a backward S6A1, forward S6A2, left S6A3, right S6A4, down S6A5 and up S6A6 translation buttons, a backward-state button B and a forward-state button F In an embodiment, when in the translation state, the movement tool MT also display a reset button R and/or a transparency button T. In an embodiment illustrated in FIG. 14, there are three translation arrows FA1, FA2, FA3 for each direction, the first arrow FA1 moving the target object TO a first amount in the given direction, the second arrow FA2 moving the object a second amount larger than the first amount, and the third arrow FA3 moving the target object a third amount, larger than the second amount. In an embodiment, these translation amounts can be set by the user. This state S6 allows the user to make small changes in the position of the target object TO when the user is not completely satisfied with the position decided on in the positioning state S3. Clicking the reset button R will undo all translation that have been performed on the target object TO while clicking on the transparency button T allows to change the transparency of the target object TO.

An example of an implementation of the method 100 according to one or more embodiments of the invention will now be given. Of course, other implementations are possible in order to use the method 100 according to other embodiments of the invention.

Movement Tool

In this example, the movement tool is implemented using a MoveObject object.

The MoveObject Object

In the description of the present example, the MoveObject denomination will be used when referencing to the movement tool MT as an object. The MoveObject has references to all objects, buttons etc., that are being used by MoveObject. It further contains a state machine that operates all the states of the MoveObject.

In order to be activated, the MoveObject has an EnableModule function that return a void. This function enables the MoveObject and makes sure everything is ready to start, calls the method AddPivotToMoveTool and starts the first MoveObject state in the initial state S1.

In order to be deactivated, the MoveObject has a DisableModule function that return a void, disables the module when the user is done placing the target object TO and turns off the MoveObject and all its components.

The MoveObject has an AddPivotToMoveObject function that return a void. It is frequent to get 3D models with a pivot that is not the center of the target object TO. For this reason, a dedicated pivot to the target object TO is added which will be perfectly in the center. To get the center of this target object TO, its bounds are calculated (basically a box around the target object TO). The center of the bounds becomes the pivot position of the target object TO for the MoveObject.

In an embodiment, when a HoloLens® is used, the MoveObject has a RemoveAndSetHololensAnchor function that return a void. Target objects TO in the HoloLens® are positioned based on their anchor that holds data of the surrounding spatial map SM. This way, the HoloLens® knows where to place the target object TO within the spatial map SM. It's not possible to move this anchor, so the anchor must be removed and set after each step of the MoveObject to store its new position and rotation.

Furthermore, the MoveObject has a SwitchMoveToolState function that returns a void and switches from one state Sx to the next state Sx. The next state needs to be given as a parameter to this function. The state machine handling the states of the MoveObject calls the ExitState function on the current state Sx and EnterEtate function on the next state Sx. All other functionalities associated with each state are handled by the individual states Sx.

The MoveObjectComponent Script

Each button, lines etc. attached to the MoveObject are represented using a MoveObjectComponent object. Each MoveObjectComponent allows a user to click on it objects and trigger an action which will depend on the MoveObject state.

Moreover the MoveObjectComponent object has a SetCallback function that return a void and sets the callback off the object the MoveObjectComponent is attached too. A callback is taken to mean here a reference to a piece of functionality within a StateFunctionality script.

The MoveObjectComponent object also has a RemoveCallback function that return a void and removes the current callback. Clicking on the MoveObjectComponent won't do anything after this.

Furthermore, the MoveObjectComponent object has a OnObjectClicked function that return a void and gets activated when the user clicks on the object and activates the current callback.

The MoveObjectComponent object also has a OnObjectFocused function that return a void and gets activated when the user looks at the target object TO and creates a highlight around the target object TO.

The MoveObjectComponent object further has a SetInteractibility function that return a void and determines if clicking on the target object TO is enabled or disabled. Clicking gets disabled when the target object TO is rotating/moving.

Position/Rotation ArrowParent Script

This script gets added to both parents of the translation S4Ax and rotation S5Ax arrows (or buttons). It will rotate the parent gameobject (or parent transform) which in turn rotates the children. This rotation is necessary to make sure the arrows are always in front of the MoveObject object depending on where the user is standing. Otherwise the arrows could be on the other side of the MoveObject object and impossible to click for the user.

The Position/Rotation ArrowParent script has an Update function that return a void and is called for each frame and uses the direction from the user to the MoveObject to calculate the correct rotation angle of the parent. There are three parents, one for each axis(x,y,z) and these parents are rotated around their specific axis. To calculate this angle the function Atan 2 and the dot product are used.

The Movement Tool States

The movement tool MT (here MoveObject object) can adopt different states. Each of this state can be represented by an object associated with a script with the notable exception of the initial (or default) state S1 which is not associated with any script. Furthermore, each state object has an EnterState function, an ExitState function and an UpdateState function, all of these functions returning a void. The action associated with each function changes according to the state of the movement tool MT (i.e. of the state associated to the MoveObject object).

The Initial State S1

This is the initial state of the movement tool MT, in this state nothing happens, the movement tool MT is completely turned off. This state S1 can be represented using DefaultMoveObjectState object. In this state S1, when executed, the EnterState function turns the entire move object off while the ExitState and UpdateState methods do nothing.

The Anchor State S2

When executed, the EnterState function creates the LoadAnchorMoveObjectFunctionality (see below) script and calls the Initialize function on this script. When executed, the ExitState function removes the LoadAnchorMoveObjectFunctionality script while, when executed, the UpdateState function does nothing.

The Anchor Functionality Script

The anchor state S2 is associated with the anchor functionality. In the present example, the anchor functionalities are in a form of a script: the LoadAnchorMoveObjectFunctionality script.

The LoadAnchorMoveObjectFunctionality script comprises a Initialize function that return a void and calls the LoadAnchors function.

The LoadAnchorMoveObjectFunctionality script also comprises a LoadAnchors function that returns an enumerator designated IEnumerator and checks with the HoloLens® anchor store if there is an existing spatial anchor. If there is no spatial anchor the state is changed to the PlaceMoveObjectState state (see below), otherwise the state is changed to the PositionTargetMoveObjectState state (see below).

The Placing State S3

In order to implement the functionalities associated to this state S3, in the present example, the placing state S3 is implemented as a PlaceMoveObjectState object. This state determines the initial position of the movement tool MT based on the position and forward direction of the camera CA, e.g. HoloLens®. When the user clicks on the MoveObject object, the MoveObject switch to the next state S4.

The EnterState function of the PlaceMoveObjectState returns a void and turns on the MoveObject object and scales it down to 20% of its original size. This scaling helps to accurately place the MoveObject object. Furthermore, the PlaceMoveObjectFunctionality gets created and its Initialize function gets called.

The ExitState function of the PlaceMoveObjectState returns a void, turns off the MoveObject object and return it to its original size. It also removes the PlaceMoveObjectFunctionality script and its callbacks.

In an embodiment, the UpdateState function of the PlaceMoveObjectState returns a void and calls the UpdateFunctionality function of the PlaceMoveObjectFunctionality script.

The Placing Functionality Script

The placing state is associated with the placing functionality. In the present example, the placing functionalities are in a form of a script: the PlaceMoveObjectFunctionality script.

The script PlaceMoveObjectFunctionality script comprises an Initialize function that return a void, calls the EnableSpatialMapping function and sets the correct callback for the MoveObject object.

The script PlaceMoveObjectFunctionality script comprises an OnObjectTapped function that return a void. This function gets called when the user clicks on the MoveObject. It calls the DisableSpatialMapping function and switches the MoveObject to the next state.

The script PlaceMoveObjectFunctionality script also comprises a RemoveCallbacks function that returns a void and removes the callback from the MoveObject.

The script PlaceMoveObjectFunctionality script further comprises an UpdateFunctionality function that return a void and calls the UpdatePosition and UpdateRotation functions.

The script PlaceMoveObjectFunctionality script also comprises an UpdatePosition function that returns a vector with 3 coordinates. This function makes sure the MoveObject is always positioned directly in front of the camera at a certain distance and checks if the MoveObject object can be placed on the spatial map. This can be done by ray casting straight ahead from the camera and seeing if we hit the spatial map.

The PlaceMoveObjectFunctionality script further comprises an UpdateRotation function that return a quaternion. This function makes sure the front of the MoveObject object is always facing the camera.

The PlaceMoveObjectFunctionality script further comprises an EnableSpatialMapping function that returns a void and turns on the spatial mapping feature within the camera, thus allowing the ray casting to the spatial map.

The PlaceMoveObjectFunctionality script also comprises a DisableSpatialMapping function that return a void and turns off the spatial mapping feature.

The Orientation State S4

In order to implement the functionalities associated with this state, in the present example, the placing state S4 is implemented as an OrientateMoveObjectState object. This state S4 determines the initial direction of the movement tool MT. This direction is determined based on the position of the camera CA (e.g. HoloLens®) relative to the MoveObject object. The sideways direction is selected by clicking on the right S4A1 and left S4A2 arrow buttons.

Pressing the forward-state button F will send you to the RotationTargetMoveObjectState and pressing the backward-state button B will send you back to the PlaceMoveObjectState.

The EnterState function of the OrientateMoveObjectState returns a void, turns on the MoveObject, lines, orientation arrows and buttons, creates the OrientateMoveObjectFunctionality script and calls the Initialize function on the OrientateMoveObjectFunctionality script.

The ExitState function of the OrientateMoveObjectState returns a void, turns off the MoveCube, lines, orientation arrows and buttons and removes the OrientateMoveObjectFunctionality script and its callbacks.

The UpdateState function of the OrientateMoveObjectState returns a void and calls the UpdateFunctionality method on the OrientateMoveObjectFunctionality script.

The Orientation Functionality Script

The orientation state is associated with the orientation functionality. In the present example, the orientation functionalities are in a form of a script: the OrientateMoveObjectFunctionality script.

The OrientateMoveObjectFunctionality script comprises an Initialize function that return a void, sets the correct callbacks for the button and arrow objects and turns on the corresponding direction line and the opposite arrow.

The OrientateMoveObjectFunctionality script further comprises a OnObjectTapped function that return a void. This function gets called when the user clicks on buttons or sideways arrows. When the sideways arrow gets clicked, this will call the SwitchDirection function. When the continue or back button gets pressed, this function will switch to the MoveObject states.

The OrientateMoveObjectFunctionality script also comprises a RemoveCallbacks function that return a void and removes the callback from the buttons and sideways arrows.

The OrientateMoveObjectFunctionality script further comprises an UpdateFunctionality function that return a void and calls the UpdateRotation and UpdateContinueButtonPosition functions.

The OrientateMoveObjectFunctionality script also comprises an UpdateRotation function that return a quaternion. This function makes sure the forward direction line of the movement tool MT always goes in the direction of the camera CA.

The OrientateMoveObjectFunctionality script further comprises a SwitchDirection function that returns a void, changes the direction of the sideways line and calls the SwapLines function.

The OrientateMoveObjectFunctionality script further comprises a SwapLines function that return a void, turns off the currently active sideways line and turns the inactive sideways line on. It also does the same for the sideways arrows.

The OrientateMoveObjectFunctionality script comprises an UpdateContinueButtonPosition function that return a void and changes the continue buttons position, so it is always next to the part of the forward direction line that the user is looking at.

The Rotation State S5

In order to implement the functionalities associated to this state S5, in the present example, the rotation state S5 is implemented as a RotationTargetMoveObjectState object. This state S5 allows the user to make small changes to the initial direction set in OrientateMoveObjectState. In this state clicking on an arrow button S5Ax will rotate the MoveObject in the direction associated with the arrow. Pressing the forward-state button F will send the MoveObject to the PositionTargetMoveObjectState, the backward-state button B will send it back to the OrientateMoveObjectState.

The EnterState function of the RotationTargetMoveObjectState returns a void and turns on the MoveObject, rotation arrows, buttons and the target object. It also creates the RotationTargetMoveObjectFunctionality object and calls Initialize function on this object.

The ExitState function of the RotationTargetMoveObjectState returns a void and turns off the MoveObject, rotation arrows and buttons. It also removes the RotationTargetMoveObjectFunctionality object and its callbacks.

The UpdateState function of the RotationTargetMoveObjectState returns a void and calls the UpdateFunctionality function on the RotationTargetMoveObjectFunctionality object.

The Rotation Functionality Script

The rotation state S5 is associated with the rotation functionality. In the present example, the rotation functionalities are in a form of a script: the RotationTargetMoveObjectFunctionality script.

The RotationTargetMoveObjectFunctionality script comprises an Initialize function that returns a void. This function sets the correct callbacks for the button and rotation arrow objects. It also makes sure the offset rotation is equal to the target object current rotation and stores the initial rotation of the target object TO.

The RotationTargetMoveObjectFunctionality script comprises an OnObjectTapped function that return a void. This function gets called when the user clicks on buttons or rotation arrows S5Ax. When a rotation arrow S5Ax gets clicked, this function will call ChangeRotationOffset. When the forward-state or backward-state button gets pressed, this function will switch movement tool states. When the reset button gets clicked the ResetRotationOffset function gets called.

The RotationTargetMoveObjectFunctionality script comprises a RemoveCallbacks function that returns a void and removes the callback from the buttons and rotation arrows.

The RotationTargetMoveObjectFunctionality script comprises an UpdateFunctionality function that return a void and calls the ChangeRotation and UpdateMoveObjectPosition functions.

The RotationTargetMoveObjectFunctionality script comprises a ChangeRotationOffset function that return a void and changes the rotation offset based on which rotation arrow gets clicked.

The RotationTargetMoveObjectFunctionality script comprises a ChangeRotation function that return a void. When the targets rotation is not equal to the rotation offset, this function starts rotating the target object TO until its rotation is equal to the rotation offset. When the target object TO starts rotating the ChangeRotation function calls the SwitchObjectInteractibility function.

The RotationTargetMoveObjectFunctionality script comprises an UpdateMoveObjectPosition function that return a void. As already described, in the rotation state S5, the movement tool MT starts moving around the target object TO, this way the movement tool MT is always in full view of the user. To this purpose, this function calculates the correct position for the movement tool MT based on position of the target object and position of the camera.

The RotationTargetMoveObjectFunctionality script comprises a SwitchObjectInteractibility function that return a void, disables the functionality to click on arrows S5Ax and buttons and calls the SetInteractibility function on the MoveObjectComponent.

The RotationTargetMoveObjectFunctionality script comprises a ResetRotationOffset function that return a void and sets the rotation offset back to the initial rotation of the target object TO.

The Translation State S6

In the present example, the translation state S6 is implemented as a PositionTargetMoveObjectState object. As already described, this state S6 allows the user to make small changes to the initial position set in PlaceMoveObjectState. For instance, clicking on an arrow S6Ax will move the MoveObject in the direction associated to the arrow. Pressing the forward-state button F will send the MoveCube object back to the DefaultMoveObjectState (described later), the backward-state button B will send you back to the RotationTargetMoveObjectState (described later).

The EnterState function of the PositionTargetMoveObjectState object returns void. This function turns on the MoveObject, position arrows S6Ax, buttons and the target object TO and creates the PositionTargetMoveObjectFunctionality (described later) script and calls Initialize on this script.

The ExitState function of the PositionTargetMoveObjectState returns a void, turns off the MoveObject, position arrows and buttons and removes the PositionTargetMoveObjectFunctionality script and its callbacks.

The UpdateState function of the PositionTargetMoveObjectState object returns a void and calls the UpdateFunctionality function on the PositionTargetMoveObjectFunctionality script.

The Translation Functionality Script

The translation state S6 is associated with the translation functionality. In the present example, the translation functionalities are in a form of a script: the PositionTargetMoveObjectFunctionality script.

The PositionTargetMoveObjectFunctionality script comprises an Initialize function that return a void. This function sets the correct callbacks for the button and position arrow objects S6Ax, makes sure the offset position is equal to the current position of the target object TO and stores the initial position of the target object TO.

The PositionTargetMoveObjectFunctionality script comprises an OnObjectTapped function that return a void. This function gets called when the user clicks on buttons or translation arrows S6Ax. When a translation arrow S6Ax gets clicked, this function will call the ChangePositionOffset function. When the forward-state or backward-state button gets pressed, this function will switch movement tool MT states. When the reset R button gets clicked the ResetPositionOffset function gets called.

The PositionTargetMoveObjectFunctionality script comprises a RemoveCallbacks function that returns a void and removes the callback from the buttons and position arrows.

The PositionTargetMoveObjectFunctionality script comprises an UpdateFunctionality that return a void and calls the ChangePosition and UpdateMoveObjectPosition functions.

The PositionTargetMoveObjectFunctionality script comprises a ChangePositionOffset function that return void and changes the position offset based on which translation arrow S6Ax gets clicked.

The PositionTargetMoveObjectFunctionality script comprises a ChangePosition function that return a void. When the position of the target object TO is not equal to the position offset, this function moves the target object TO until its position is equal to the position offset. During the target object movement this function calls the SwitchObjectInteractibility function.

The PositionTargetMoveObjectFunctionality script comprises an UpdateMoveObjectPosition function that return a void. As already described, in this state S6, the movement tool MT starts moving around the target object TO so that the movement tool MT is always in full view of the user. To achieve that goal, this function calculates the correct position for the movement tool based on position of the target object TO and the position of the camera.

The PositionTargetMoveObjectFunctionality script comprises a SwitchObjectInteractibility function that return a void and disables the functionality to click on arrows S6Ax and buttons and calls the SetInteractibility function on the MoveObjectComponent object.

The PositionTargetMoveObjectFunctionality script comprises a ResetPositionOffset function that return a void and sets the position offset back to the initial position of the target object TO.

Device Implementing the Method According to One or More Embodiments of the Invention A second aspect of one or more embodiments of the invention concerns a device comprising means configured to implement the method according to a first aspect of one or more embodiments of the invention. The device comprises a computing means such as a processor or an ASIC card, and a memory. The memory is configured to store the data and instructions necessary for the computing means to implement the step of the method according to the first aspect of one or more embodiments of the invention. The device also comprises a means to display the virtual environment, such as an optical head-mounted display (e.g. HoloLens®).

Figure 15:
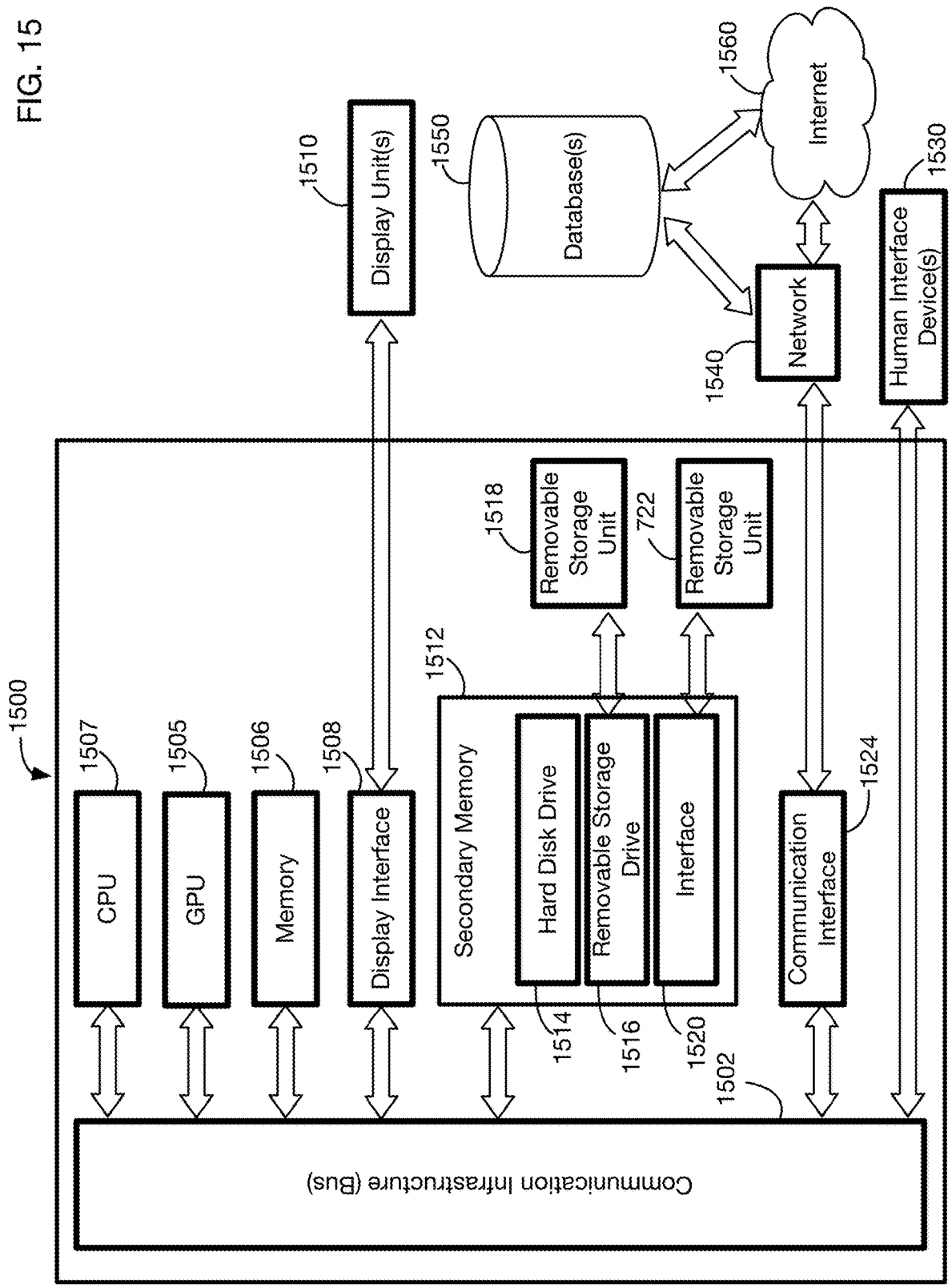
FIG. 15 shows illustrative computer hardware that may be incorporated into one or more embodiments of the system and may be used to execute any or all of the functions of the system.

For example, all stages may be performed using a computer having memory and specific instructions to perform each stage of the processing in one or more embodiments of the invention. FIG. 15 shows an exemplary computer 1500 that may be utilized in, by, or as any component in the system described herein, according to one or more embodiments of the invention. In other words, for example, in at least one embodiment of the invention, any component, element, structure, method or function described herein may be performed, include or used by computer 1500 and the elements thereof shown in FIG. 15. In at least one embodiment, computer 1500 may be used for example to execute or host any or all of method 100, including steps S1-S6. In one or more embodiments, computer 1500 may be a network of computers, each of which may have any or all of the components shown in FIG. 15. In one or more embodiments, computer or computers 1500 may also be utilized to implement any function in the system, i.e., any step or act or function that executes in any computer or server or engine in the system. In at least one embodiment of the invention, computer 1500 may include processor CPU 1507 that executes software instructions specifically tailored to the respective functions of embodiments of the invention. By way of at least one embodiment, the software instructions, such as computer program instructions, may reside within memory 1506. In at least one embodiment, computer 1500 may include processor GPU 1505, which may execute graphics instructions or other instructions for highly parallel operations, for example. GPU program instructions may also reside within memory 1506, according to one or more embodiments of the invention. In at least one embodiment, computer 1500 may include display interface 1508, which may drive display unit or units 1510 of any computer in the system as desired. In one or more embodiments, some computers 1500 may or may not utilize a display. Computer 1500 may include communication interface 1524, which may include wireless or wired communications hardware protocol chips, according to at least one embodiment. In one or more embodiments of the invention, communication interface 1524 may include telephonic and/or data communications hardware.

In one or more embodiments, communication interface 1524 may include a Wi-Fi™ and/or BLUETOOTH™ wireless communications interface. Any wireless network protocol or type may be utilized in embodiments of the invention. In at least one embodiment, CPU 1507, GPU 1505, memory 1506, display interface 1508, communication interface 1524, human interface devices 1530, secondary memory 1512, such as hard disk 1514, removable storage 1516, secondary memory interface 1520 and removable storage units 1518 and 1522 may communicate with one another over communication infrastructure 1502, which is commonly known as a "bus". By way of at least one embodiment, communications interface 1524 may communicate over any wired or wireless medium that allows for communication with other wired or wireless devices over network 1540. In one or more embodiments, network 1540 may communicate with Internet 1560 and/or database or databases 1550. According to one or more embodiments of the invention, database 1550 may be utilized to implement or hold any data described herein.

What is claimed is:

1. A method for moving a target object in a virtual environment visualized using a camera, the method comprising:
    generating of a movement tool, said movement tool being at any moment in one and only one of a plurality of states; wherein
        said plurality of states comprises an initial state, an anchor state, a moving or placing state, an orientation state, a rotation state and a translation state; and
        each state of said plurality of states is associated with one or both of a specific configuration of the movement tool and a specific action performed by the movement tool;
    setting the movement tool in the initial state in which the target object is not yet selected;
    upon selection of the target object,
        setting the movement tool in the anchor state;
        when said movement tool is associated with a stored position, setting a position of the target object to said stored position; and
        when said movement tool is associated with a stored orientation, setting an orientation of the target object to said stored orientation;
    if said movement tool is not associated with said stored position, setting the movement tool in the moving or placing state in which only the movement tool is visible and in which said movement tool is configured to follow a looking direction of the camera and is configured to set the position of the target object based on input from a user;
    if said movement tool is not associated with said stored orientation, setting the movement tool in the orientation state in which the movement tool is visible and in which one or both of a right direction button and a left direction button are visible and in which said movement tool is configured to set a direction in which the target object is placed based on input from one or both of said left direction button and said right direction button;
    setting the movement tool in the rotation state in which the movement tool and the target object are visible and in which a rotation of the target object is set using one or more buttons associated with the movement tool;
    setting the movement tool in the translation state in which the movement tool and the target object are visible and in which the position of the target object is set using said one or more buttons associated with the movement tool.

2. The method of claim 1 wherein said set the direction in which the target object is placed comprises:
    selecting a position of the movement tool with respect to the target object from position options comprising
        a left position where the target object is placed left of the movement tool; and
        a right position where the target object is placed right of the movement tool; and
    selecting a forward direction of the movement tool.

3. The method of claim 2, wherein said selecting the forward direction of the movement tool comprises walking around the movement tool.

4. The method of claim 1, wherein said generating of the movement tool comprises:
    generation of a plurality of buttons, wherein each button of said plurality of buttons is associated with one or more states of said plurality of states of the movement tool;
    when the movement tool is in the orientation state, generating
        a plurality of direction indicator lines;
        a left arrow button; and
        a right arrow button;
        wherein
            only one of said plurality of direction indicator lines is displayed at a time;
            each indicator line of said plurality of direction indicator lines is associated with a position of the target object with respect to the movement tool; and
            a direction of said only one of said plurality of direction indicator lines is set using one or both of said left arrow button and said right arrow button;
    when the movement tool is in the rotation state, generating a plurality of rotation buttons comprising
        a backward rotation button;
        a forward rotation button;
        an up rotation button;
        a down rotation button;
        a right rotation button; and
        a left rotation button;
        wherein
            each rotation button of said plurality of rotation buttons is associated with a corresponding rotation movement of the target object;
    when the movement tool is in the translation state, generating a plurality of translation buttons comprising
        a backward translation button;
        a forward translation button;
        an up translation button;
        a down translation button;
        a right translation button; and
        a left translation button;
        wherein
            each translation button of said plurality of translation buttons is associated with a corresponding translation movement of the target object.

5. The method of claim 1, further comprising a device configured to carry out the method.

6. The method of claim 1, further comprising a computer program comprising instructions which, when the computer program is executed by a computer, cause the computer to carry out the method.

7. The method of claim 6, further comprising a computer-readable data carrier having stored thereon the computer program.

* * * * *